United States Patent
Flores Sandoval et al.

(10) Patent No.: US 10,793,783 B2
(45) Date of Patent: Oct. 6, 2020

(54) WATER/CRUDE OIL REMOVERS BASED ON ALKYLACRYLIC-CARBOXYALKYLACRYLIC RANDOM COPOLYMERS OF CONTROLLED MOLECULAR MASS

(71) Applicant: INSTITUTO MEXICANO DEL PETROLEO, Mexico City (MX)

(72) Inventors: Cesar Andres Flores Sandoval, Mexico City (MX); Marco Antonio Chavez Mora, Mexico City (MX); Edgar Benedicto Zamora Guerrero, Mexico City (MX); Alfonso Lopez Ortega, Mexico City (MX); Gerardo Zavala Olivares, Mexico City (MX); Fernando Alvarez Ramirez, Mexico City (MX); Flavio Salvador Vazquez Moreno, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 114 days.

(21) Appl. No.: 16/109,135

(22) Filed: Aug. 22, 2018

(65) Prior Publication Data
US 2019/0276750 A1    Sep. 12, 2019

(30) Foreign Application Priority Data
Mar. 9, 2018 (MX) .................. MX/a/2018/002971

(51) Int. Cl.
C10G 33/04 (2006.01)
C08F 220/18 (2006.01)
C08F 220/34 (2006.01)

(52) U.S. Cl.
CPC ............ *C10G 33/04* (2013.01); *C08F 220/18* (2013.01); *C08F 220/34* (2013.01); *C08F 220/1811* (2020.02); *C08F 2800/20* (2013.01); *C10G 2300/208* (2013.01); *C10G 2300/308* (2013.01)

(58) Field of Classification Search
CPC .............. C10G 33/04; C10G 2300/308; C10G 2300/208; C08F 220/34; C08F 220/18; C08F 2800/20; C08F 2220/1875
USPC ....................................................... 524/379
See application file for complete search history.

(56) References Cited

U.S. PATENT DOCUMENTS

| | | | |
|---|---|---|---|
| 2,425,845 A | 8/1947 | Toussaint et al. | |
| 3,334,038 A | 8/1967 | Lucas | |
| 4,614,593 A | 9/1986 | Roark | |
| 5,100,582 A | 3/1992 | Bhattacharyya | |
| 5,156,767 A | 10/1992 | Fitzgerald et al. | |
| 5,472,617 A | 12/1995 | Barthold et al. | |
| 5,730,905 A | 3/1998 | Hart et al. | |
| 5,921,912 A | 7/1999 | Hart et al. | |
| 9,120,885 B2 | 9/2015 | Castro Sotelo et al. | |
| 2017/0015897 A1* | 1/2017 | Hernandez Carbajal | F15D 1/02 |

FOREIGN PATENT DOCUMENTS

| CN | 101255354 B1 | 9/2008 |
|---|---|---|
| MX | MX/a/2013/014352 | 6/2015 |
| MX | 338861 | 4/2016 |
| MX | MX/a/2016/016226 | 6/2018 |

OTHER PUBLICATIONS

Cendejas, G., et al., "Demulsifying super-heavy crude oil with bifunctionalized block copolymers", Fuel, 103, 356-363, (2013).
Alvarez, F. et al., "DPD study of water/crude oil emulsions in the presence of a functionalized copolymer", Energy & Fuels, 25 (2), 562-567, (2011).
Bolto, B.,et al., "Organic polyelectrolytes in water treatment", Water research, 41(11), 2301-2324, (2007).
Castro L. V. et al., "Copolymers as flow improvers for Mexican crude oils", Energy & Fuels, 22(6), 4006-4011 (2008).
Atta, A. M., et al., "Dipole poly (ionic liquids) based on 2-acrylamido-2-methylpropane sulfonic acid-co-hydroxyethyl methacrylate for demulsification of crude oil water emulsions", Journal of Molecular Liquids, 222, 680-690, (2016).

* cited by examiner

*Primary Examiner* — Hui H Chin
(74) *Attorney, Agent, or Firm* — Jason P. Mueller; FisherBroyles, LLP

(57) ABSTRACT

A problem of the crude oil industry is the presence of large amounts of water and salts, which can not be efficiently removed by conventional dehydrating polymers. In addition, the acid stimulation operations of petroleum wells cause the chemical degradation of demulsifiers such as polyethers and phenolic resins, reducing drastically their efficiency as water and salt removers. Disclosed herein is a series of new copolymers that are combinations of an alkyl acrylate and a carboxyalkyl acrylate, synthesized by semi-continuous emulsion polymerization (under starved feed conditions), which ensures both the homogeneity of the different chains as well as the randomness of the monomers distribution. The acrylic-carboxyacrylic copolymers show good performance as water/oil emulsion breaker initiators, water droplet coalescers and clarifiers of the remaining aqueous phase. These novel acrylic-carboxyacrylic copolymers show a higher clarification capacity in comparison with acrylic copolymers [19], vinyl acrylics [12] and polyethers.

9 Claims, 7 Drawing Sheets

WATER/CRUDE OIL REMOVERS BASED ON ALKYLACRYLIC-CARBOXYALKYLACRYLIC RANDOM COPOLYMERS OF CONTROLLED MOLECULAR MASS

CROSS-REFERENCE TO RELATED APPLICATIONS

The present invention claims priority to Mexican Patent Application No. MX/a/2018/002971, filed Mar. 9, 2018, currently pending, the contents of which is incorporated by reference herein and priority of which is hereby claimed.

TECHNICAL FIELD OF THE INVENTION

The present invention corresponds to the field of chemical products for petroleum conditioning, particularly to demulsifiers. This invention is related to the application of copolymers based on alkyl acrylate-carboxyalkyl acrylate to control the formation of water-in-oil (W/O) emulsions, in order to remove emulsified water and dissolved salts in the aqueous phase, from triphasic separation units for crude oils with densities between 5 and 40° API.

BACKGROUND OF THE INVENTION

A quotidian problem in the oil industry is the removal of large amount of water and salts. Nowadays, crude oils have a higher amount of resins and asphaltenes, provoking a higher stabilization of dispersed water in crude oil. Therefore, a formed emulsion is more stable, being more difficult to destabilize the water/crude oil interphase. Chemical treatment to remove the emulsified water is a procedure widely used in oil industry. This chemical treatment consists of injecting a demulsifier agent that should be capable of destabilizing the water/crude oil interphase. However, because crude oils are of low API density (heavy and extra-heavy), it is necessary to make the demulsifier more efficient to remove the greater amount of emulsified water.

The main chemical products currently employed as dehydrating agents in crude oil are: triblock polyethers of EO-PO-EO [1,2], resins, sulfonates, polyglycols, polyamines, di-epoxides, uretanes, polyesters, polyalkenyls, polyesteramines and oxialkylates.

Regarding triblock copolymers of EO-PO-EO, it has been observed that its performance to remove emulsified water in crude oils depends on: 1) chemical structure of copolymer, 2) monomer composition, and 3) average molecular mass (length of polymeric chain) [3,4].

On the other hand, some vinylic polymers have been employed as breakers of water/oil or oil/water emulsions. In U.S. Pat. No. 4,614,593 is claimed the usage of polymers of monoalylamines as demulsifier agents, which were evaluated in synthetic emulsion of oil in water, employing as disperse phase a commercial motor oil SAE 10W30 and as stabilizing agents a mixture of dodecylic and tetradecylic alcohols [5]. However, it is important to point out that this kind of emulsion is easier to destabilize than an emulsion directly stabilize for asphaltenes, as it is the case of crude oil emulsions.

In U.S. Pat. No. 5,921,912 has been employed copolymers consisting of no-ionic lipophilic monomers and ammonium cationic salts to break down or inhibit the formation of oil-in-water or water-in-oil emulsions, under desalting operations conditions of Californian crude oils (138<T<150° C.). Copolymers were synthesized by solution or emulsion polymerization; however, these are hydrosoluble, so that their hydrophylicity makes their dosage in crude oil very difficult. For this reason, the dispersion problem of copolymers in crude oils hinders its application as breakers of water/crude oil emulsions. Likewise, in the literature was described that the molecular mass value of demulsifier agents plays a key role in the removal efficiency of emulsified water [3,4]. Although, it has been described that the copolymers protected in U.S. Pat. No. 5,921,912 [6] were prepared in a range of Mn between 20,000 to 20,00,000 g/mol, a control of molecular mass of such compounds during the solution or emulsion synthesis was not mentioned.

Copolymers based on acrylamide and 2-acryloyloxyethyltrimethylammonium chloride have been synthesized and evaluated to inhibit and suppress the formation of water/oil and oil/water emulsions (138<T<150° C.). These copolymers are described in U.S. Pat. No. 5,730,905 [7] and were evaluated as desalters of Californian crude oils, under refinery conditions, for emulsions that have between 2 to 50 vol % of crude oil at 150° C. According to the amount of crude oil present in the system, the formed emulsion is of oil/water type. Similar to the previous case, the temperature of the demulsifying process is very high (150° C.). With regard to molecular mass, the authors mentioned that copolymers are found between 2 000 000 and 40 000 000 g/mol. Because of their high viscosity, these copolymers are difficult to handle, so they must be dissolved in water. In order to be applied in water/oil emulsions, which are the most common in the oil industry, it is necessary that the aqueous solution of the copolymer should be previously emulsified in an organic solvent, which is expensive and cumbersome. In addition, there is a risk that, after de-emulsification, these chemical compounds remain in the aqueous phase, which is environmentally harmful, finally, the copolymers of U.S. Pat. No. 5,730,905 are synthesized by inverse emulsion polymerization, a process that involves the use of organic solvents and separation operations, which makes it less advantageous than direct emulsion polymerization.

In U.S. Pat. No. 5,156,767 [8], (Emulsion breaking using alkylphenol-polyethylene oxide-acrylate polymer coated coalescer material), the usage of a copolymer that has an alkylphenol, ethylene oxide and acrylic is described, which shows effectiveness to break down water-in-oil emulsions. Polymers were evaluated in a mixture of Hutton crude oil and brine of Tisdale field.

Concerning demulsifier based on acrylics, in CN Patent 101255354 [9] was reported the performance of copolymers of butyl acrylate and acrylic acid as demulsifiers of crude oil. The authors reported a good performance in breakdown of emulsion and good clarification of aqueous phase.

In U.S. Pat. No. 5,472,617 [10] was employed a copolymer in blocks based on acrylics and oxyalkylates (ethylene and propylene oxide derivatives). However, the synthesis process implied several steps to prepare the comonomers and, once copolymers were obtained, they should be eliminated through a subsequent modification. Another drawback of these copolymers is the usage of organic solvents as xylene or toluene in the synthesis process.

In U.S. Pat. No. 5,100,582 [11] was protected a tetrapolymer of methyl methacrylate, butyl acrylate, acid acrylic and methacrylic acid, as well of a pentapolymer synthesized from methyl methacrylate, butyl acrylate, acrylic acid, methacrylic acid and styrene as destabilizer of water/oil emulsions. Polymers are water-soluble and were evaluated in a "crude oil replicate", that is a mixture of heptane and toluene. In the document, the stabilizing effect of asphaltenes in water/oil emulsions is not taken into account, which is not emulated by the organic solvent mixture used to evaluate the tretapolymer and pentapolymer. Therefore, the efficiency of these chemical compounds for dehydrating of real crude oil is questionable.

D. Ramirez [12] (pp. 120-126) reported in 2014 the usage of vinyl-acrylic copolymers as demulsifier agents of crude oils. These chemical products are synthesized by emulsion polymerization, a synthesis process that employs water instead of organic solvents, with clear environmental advantages. Vinyl-acrylic copolymers showed an excellent performance to remove the emulsified water in heavy crude oils.

On the other hand, González Palacios [13] synthesized copolymers form two alkyl acrylic monomers, which were evaluated as demulsifier agents. It was observed that there exists an important influence of molecular mass of copolymers in the performance to remove the emulsified water of crude oils. However, such acrylic-acrylic copolymers showed to be efficient to remove the emulsified water from crude oil only at dosage greater than 1500 ppm.

Recently, Atta et al. [14] reported the usage of poly ionic liquids of acrylic type to destabilize water/heavy crude oil emulsions. These copolymers were synthesized by solution emulsion, employing tetrahydrofuran as solvent. It was not mentioned the control of average molecular mass of macromolecules. The inventors observed a remarkable clarifying capacity of the removed aqueous phase clarification from emulsion after being dosage such poly ionic liquids.

A similar case was studied by Martinez Gallegos [15], who reported the usage of copolymers of 2-carboxyethyl acrylate (F) and 2-(dimethylamine)ethyl methacrylate (E), in ratio of F/E: 50/50 and 70/30 w/w, as dehydrating agents of crude oil. Such copolymers were insoluble in organic solvents, so they had to be dissolved in water under basic conditions. Although, with the combination of a carboxyacrylic monomer and another amino acrylic, high demulsifying rates were achieved, the need to add these acrylic demulsifiers in aqueous solutions constitutes a disadvantage for their field application to destabilize water/crude oil emulsions. From the environmental point of view, the hydrophilicity of these carboxyacrylic-amino acrylic copolymers also represents a difficulty [16], since the fact that the demulsifier remains in the aqueous phase is a serious problem. In the oil industry is required that the demulsifiers, once fulfilled their function, remain dissolved in the crude oil.

Garcia Jiménez [17] and Chávez Mora [18] mentioned the performance as dehydrating agents of certain random copolymers based on acrylic, which were dissolved in organic solvents. These random copolymers proved to be very efficient to remove emulsified water in light and heavy crude oils. However, nowhere in the documents were reported the chemical structures or the proportions of the employed monomers to synthesize the demulsifying copolymers of crude oil, making it impossible to infer that combinations of the numerous acrylic monomers are capable of dehydrating crude oils.

The Mexican patent application MX/a/2016/016226 describes the usage of random copolymers of acrylic and aminoacrylic monomers as breakers of water/crude oil emulsion, mainly for crude oils with densities of 10 to 40° API.

The development of novel random copolymers of acrylic monomers and carboxyacrylic, with properties as breakers of water/oil emulsions, water drop coalescers and clarifiers of the aqueous phase, is shown in the present invention. The synthesis of these dehydrating agents of crude oils was carried out by semi-continuous emulsion polymerization, a process developed in the Mexican Petroleum Institute, described in the application patents MX/a/2016/016226, U.S. Pat. No. 9,120,885 [20] and MX/a/2013/014352 [21]. Emulsion polymerization was carried out under starved feed conditions, which guarantees the copolymer homogeneity (no composition drifts) and a random monomer distribution in the chain. The synthesis process requires the usage of a chain-transfer agents, chemical compound that allows controlling the average molecular mass of the polymeric chains. This molecular parameter is the great importance, since the efficiency of dehydrating process of light or heavy crude oils depends largely on it. The presence of suitable amounts of alkyl acrylic monomers in the copolymer allows their dissolution in the crude oil, whereas the carboxyalkyl acrylic moiety in the chain interact with the aqueous phase. The proportions of the acrylic and carboxyacrylic monomers were adjusted in order to obtain synthesized copolymers soluble in the organic phase, so they can be applied directly in crude oil and without the risk of being trained by the remaining aqueous phase [16]. Unlike other demulsifiers reported in the literature, these alkyl acrylic-carboxyalkyl acrylic copolymers were directly evaluated in light, heavy and extra-heavy crude oils. Molecular characteristics of novel acrylic-carboxyacrylic, composition and molecular mass could be adjusted according to characteristic of each crude oil, optimizing their performance as dehydrating agents and thus, showing a better efficiency/cost ratio than the commercially available dehydrating agents.

REFERENCES

[1] Fife, H. R., and Toussaint, W. J., "*Mixtures of polyoxyalkylene diols and methods of making such mixtures*", U.S. Pat. No. 2,425,845, 19 Aug. 1947.

[2] Lucas, R. N., "*Phase separation process*", U.S. Pat. No. 3,334,038, 1 Aug. 1967.

[3] Cendejas, G., Arreguin, F., Castro, L. V., Flores E. A. and Vázquez, F., "*Demulsifting super-heavy crude oil with bifunctionalized block copolymers*", Fuel, 103, 356-363, (2013).

[4] Álvarez, F., Flores, E. A., Castro, L. V., Hernández, J. G., López, A. and Vázquez, F., "*DPD study of water/crude oil emulsions in the presence of a functionalized copolymer*", Energy & Fuels, 25 (2), 562-567, (2011).

[5] Roark, D. N., "*Demulsification oil-water emulsions*" U.S. Pat. No. 4,614,593, 30 Sep. 1986.

[6] Hart, P. R., Chen, F., Liao, W. P., & Burgess. W. J. "*Copolymer formulations for breaking oil-and-water emulsions*" U.S. Pat. No. 5,921,912. 13 Jul. 1999.

[7] Hart, P. R., Brown, J. M. and Connors, E. J. "*Method of resolving oil and water emulsions*" U.S. Pat. No. 5,730 905, 24 Mar. 1998.

[8] Fitzgerald, P. H., Wolf, N. O., Clark, C. R., & Cords, D. P. "*Emulsion breaking using alkylphenol-polyethylene oxide-acrylate polymer coated coalescer material.*" U.S. Pat. No. 5,156,767, 20 Oct. 1992.

[9] Xu Wei, Sheng L. Z., Tian Y, F. and Chen Y. P., "*Non-polyether type heavy oil demulsifier and its preparation method*", China patent CN 101255354 B1, May. 2011.

[10] Barthold, K., Baur, R Crema, S., Oppenlaender, K., & Lasowski, J., "*Method demulsifying crude oil and water mixtures with copolymers of acrylates or methacrylates and hydrophilic comonomers*", U.S. Pat. No. 5,472,617, 5 Dec. 1995.

[11] Bhattacharyya, B. R. "*Water soluble polymerwater-in-oil demulsifier*", U.S. Pat. No. 5,100,582, 31 Mar. 1992.

[12] Ramirez D., "*Estudio teórico experimental del potential de deshidratado de crudos pesados inducido por polimeros de adición*", Tesis de maestría, Instituto Mexicano del Petróleo, July (2014), pp. 120-126.

[13] González Palacios N., "*Sintesis de copolimeros base acrilatos de alquilo via polimerización en emulsión tomo agentes desemulsionantes en aceites crudos pesados mexicanos*", Tesis I.Q.I., ESIQIE, IPN, Dic. (2015), pp. 66, 117-130 y 136.

[14] Atta, A. M., Al-Lohedan, H. A., & Abdullah, M. M. "*Dipole poly (ionic liquids) based on 2-acrylamido-2-methylpropane sulfonic acid-co-hydroxyethyl methacrylate for demulsification of crude oil water emulsions*", Journal of Molecular Liquids, 222, 680-690, (2016).

[15] Martinez Gallegos A. A., "*Nuevo proceso de deshidratado de petróleo empleando copolimeros acrilicos aleatorios*", Tesis I.Q.I., ESIQIE, IPN, September, (2017), pp. 82-84.

[16] Bolto, B. & Gregory, J. Organic polyelectrolytes in water treatment. "*Water research*", 41(11), 2301-2324, (2007).

[17] García Jiménez R. J., "*Estudio teórico-experimental del rompimiento de emulsiones agua/petróleo mediante copolimeros base acrilicos*", Tesis I.Q.I., ESIQIE, IPN, September (2016).

[18] Chávez Mora M., "*Nuevos agentes desemulsionantes base acrilicos para la remoción de emulsiones agua/aceite crudo*", Tesis I.Q.I., ESIQIE, IPN, Ago. (2017).

[19] Hernández E. I., Flores C. A., Álvarez F. López A. Garcia R. J., Zavala G., Clavel J. C. y Vázquez F. S., "*Desemulsionantes para aceites crudos con base en copolimeros aleatorios acrilico-aminoacrilico de masa molecular controlada*", Solicitud de patente mexicana MX/a/2016/016226, Dic. 8 (2016).

[20] Sotelo, L. V. C., Flores, E. A., Cendejas, Lozada, M. & Vázquez F. (2015). "*Formulations of random polymers for improving crude petroleum flow*", U.S. Pat. No. 9,120, 885. 1 Sep. 2015.

[21] Cevada E., Castro L. V., Hernández E., Flores C. A., López A., Estrada A., Alvarez F. y Vazquez F. S., "*Formulaciones de homopolimeros base acrilatos de alquilo empleadas tomo antiespumantes en aceites crudos pesados y súper pesados*", Solicitud de patente mexicana MX/a/2013/014352, Dic. 6 (2013).

[22] Castro. L. V., Flores, E. A., Cendejas, G. C., Lozada., M. y Vázquez, F. (2016). "*Formulación de polimeros aleatorios para mejorar flujo de crudos del petróleo*" Patente Mexicana MX 338861 B.

[23] Castro L. V. and Vazquez F. S., "*Copolymers as flow improvers for Mexican crude oils*", Energy & Fuels, 22(6), 4006-4011 (2008).

BRIEF DESCRIPTION OF THE DRAWINGS

Various aspects and features of the present disclosure as described herein with reference to the drawings, wherein.

DETAILED DESCRIPTION OF THE INVENTION

Figure 1:
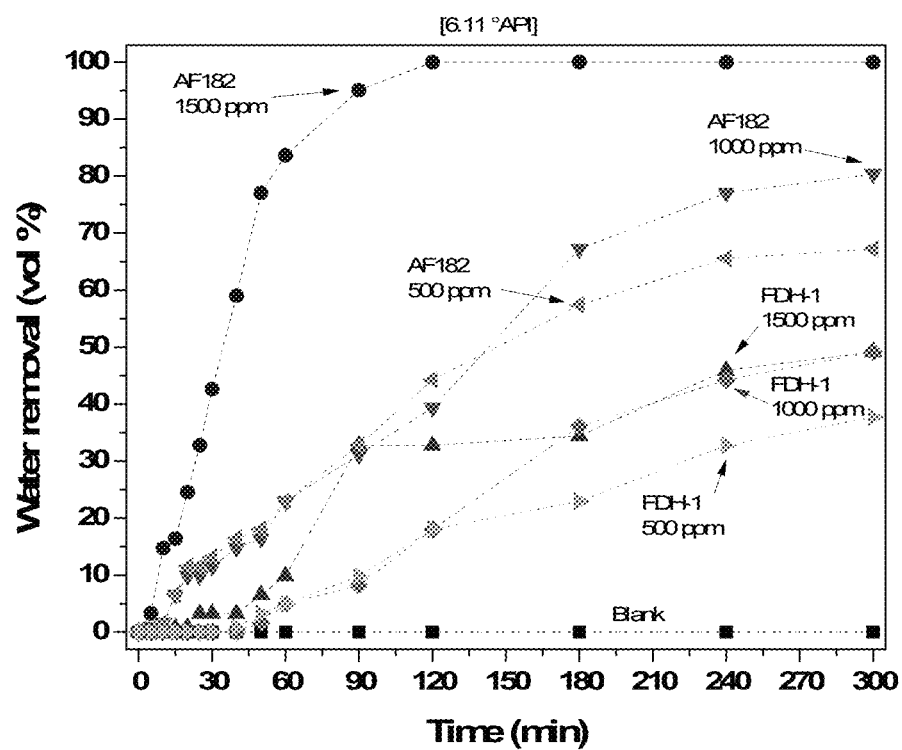
FIG. 1 reports the performance of copolymers based on alkyl acrylate-carboxyalkyl acrylate as dehydrating agents in extra-heavy crude oil of 6.11° API (Ayin-04)

In FIG. 1 is reported the performance of acrylic-carboxyacrylic random copolymers, labeled in this invention as AF182, with a proportion of A-monomer of 80 wt % and F-monomer of 20 wt %, evaluated as demulsifier agent in a crude oil of 6.11° API (Ayin-04), dosed at 500, 1000 and 1500 ppm. Copolymer was compared with the FDH-1commercial formulation and with the untreated crude oil (blank).

Figure 2:
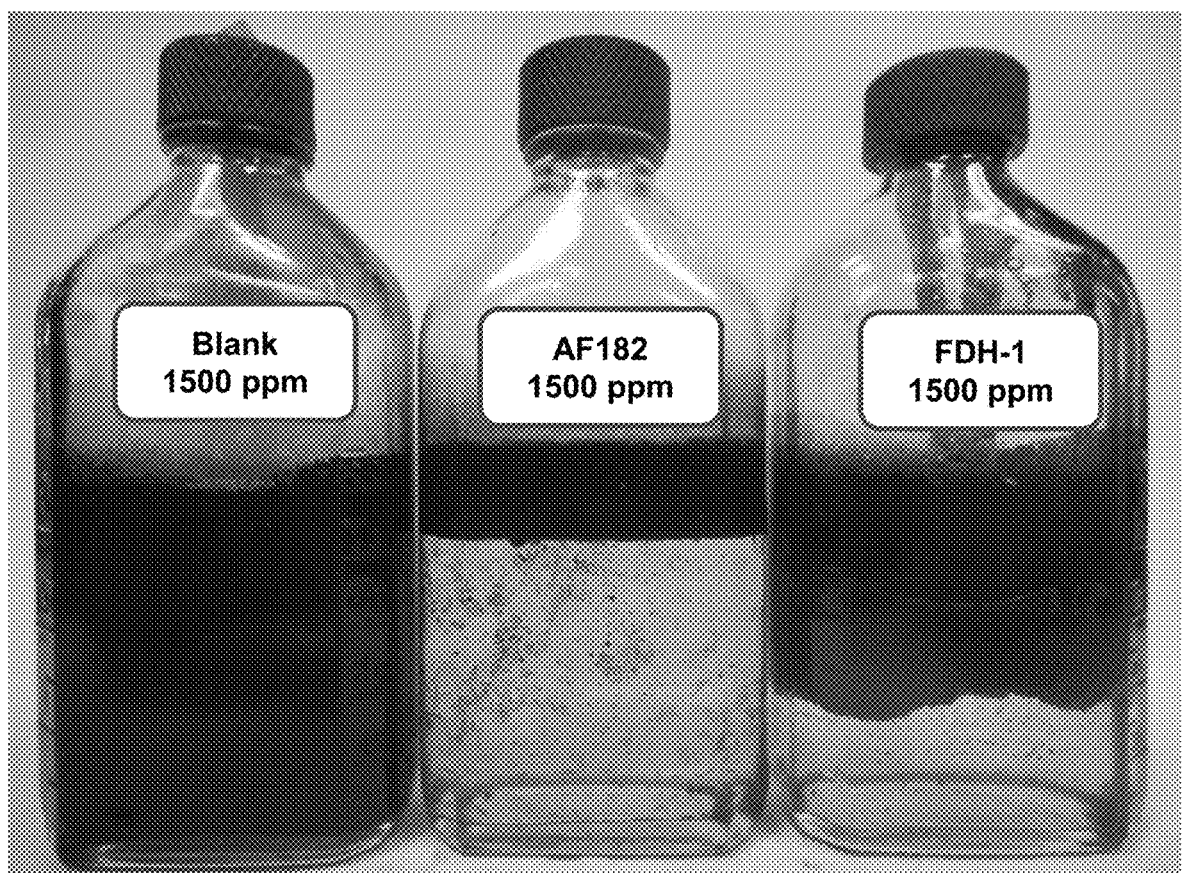
FIG. 2 depicts the images of testing bottles following a dehydrating assessment.

In FIG. 2 is shown the images of the testing bottle once the dehydrating assessment ended: (a) bottle with untreated crude oil (blank), (b) bottle dosed with the AF182 acrylic-carboxyacrylic copolymer, and (c) bottle dosed with the FDH-1 commercial product. All products were dosed at 1500 ppm in Ayin-04 crude oil (6.11° API).

Figure 3:
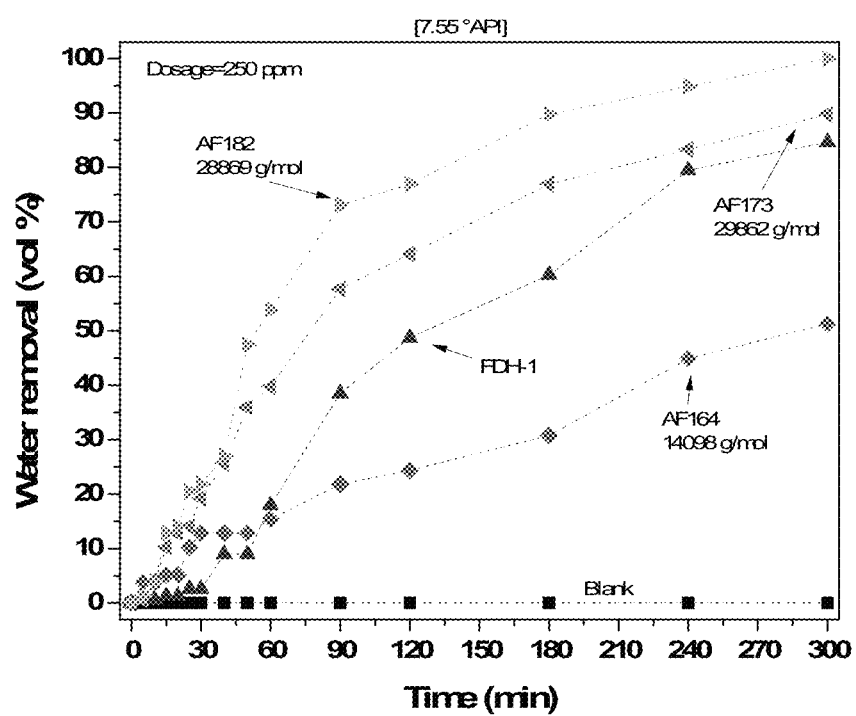
FIG. 3 reports the performance of alkyl acrylate-carboxyalkyl acrylate copolymers in an extra-heavy crude oil of 7.55° API (Ayin-03)

FIG. 3 shows the demulsifying activity of acrylic-carboxyacrylic random copolymers labeled in this invention as AF182 (with a proportion of A-monomer of 80 wt % and F-monomer of 20 wt %), AF173 (with a proportion of A-monomer of 70 wt % and F-monomer of 30 wt %) and AF164 (with a proportion of A-monomer of 60 wt % and F-monomer of 40 wt %), which were synthesized in semi-continuous reactor. The performance of copolymers was compared with the FDH-1 commercial formulation. Compounds were evaluated as demulsifier agents in crude oil of 7.55° API (Ayin-03), dosed at 250 ppm. The performance of products was contrasted with the behavior of untreated crude oil (blank).

Figure 4:
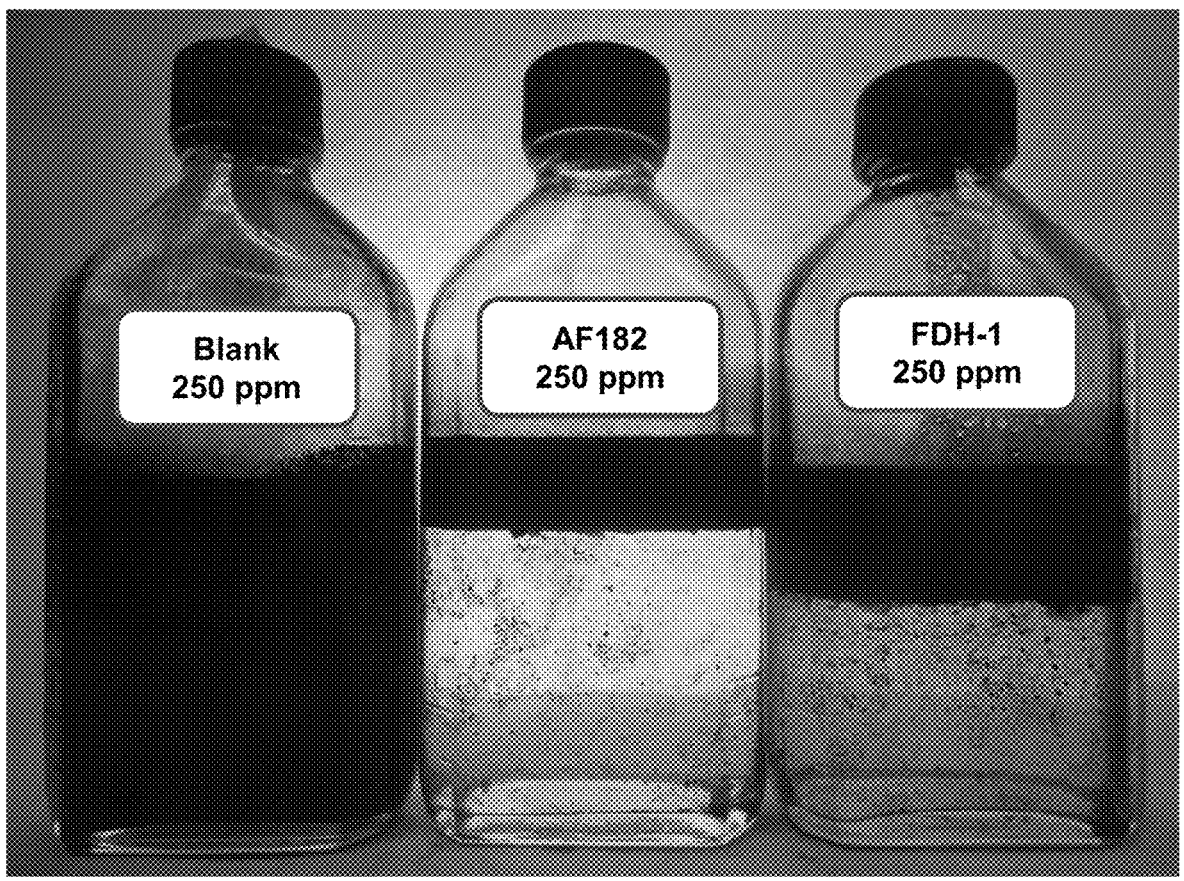
FIG. 4 depicts the images of testing bottles following a dehydrating assessment.

In FIG. 4 is shown the images of the testing bottle once the dehydrating assessment ended: (a) bottle with untreated crude oil; (b) bottle dosed with the AF182 acrylic-carboxyacrylic copolymer, and (c) bottle dosed with the FDH-1 commercial product. All products were dosed at 250 ppm and evaluated in Ayin-03 crude oil (7.55° API).

Figure 5:
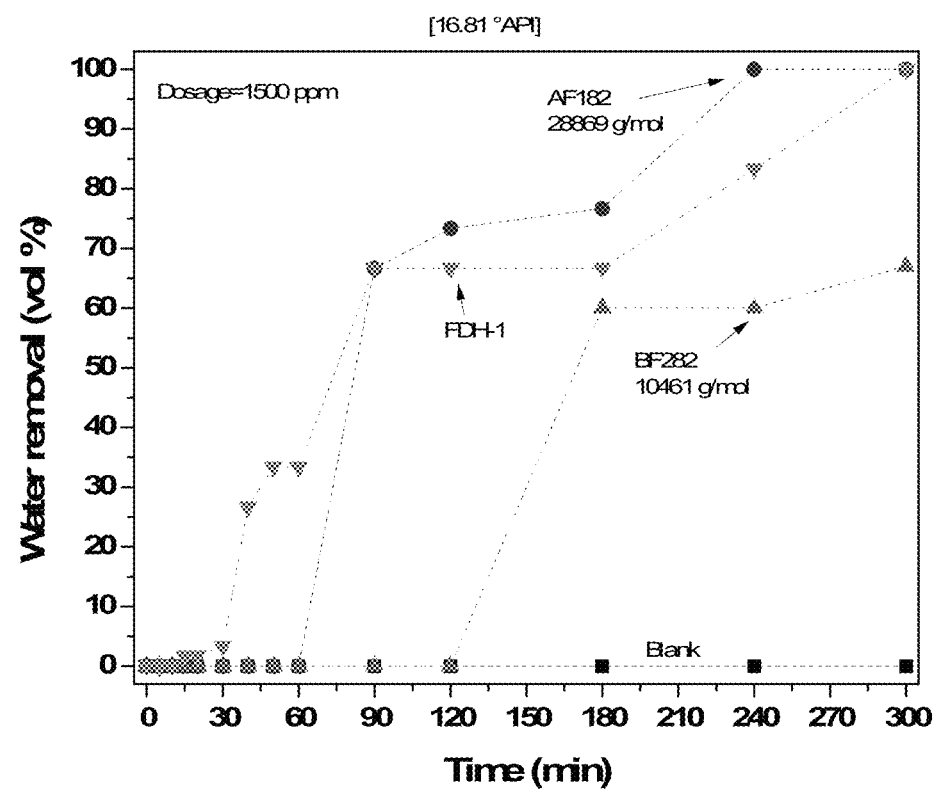
FIG. 5 displays the performance of these copolymers in heavy crude oil of 16.81° API (Ayin-02)

FIG. 5 shows the demulsifier activity of acrylic-carboxyacrilic random copolymer labeled in this invention as: AFA182 (with a proportion of A-monomer of 80 wt % and F-monomer of 20 wt %) and BF282 (with a proportion of B-monomer of 80 wt % and F-monomer of20 wt %). The AF182 and BF282 copolymers were synthesized by a semi-continuous process, employing a chain transfer agent in a proportion of 1, 2 and 4 wt %. These copolymers were compared with the FDH-1 commercial formulation. Assessment was carried out in a heavy crude oil of 16.81° API (Ayin-02) at a dosage of 1500 ppm; all demulsifier agents were contrasted with the untreated crude oil (blank).

Figure 6:
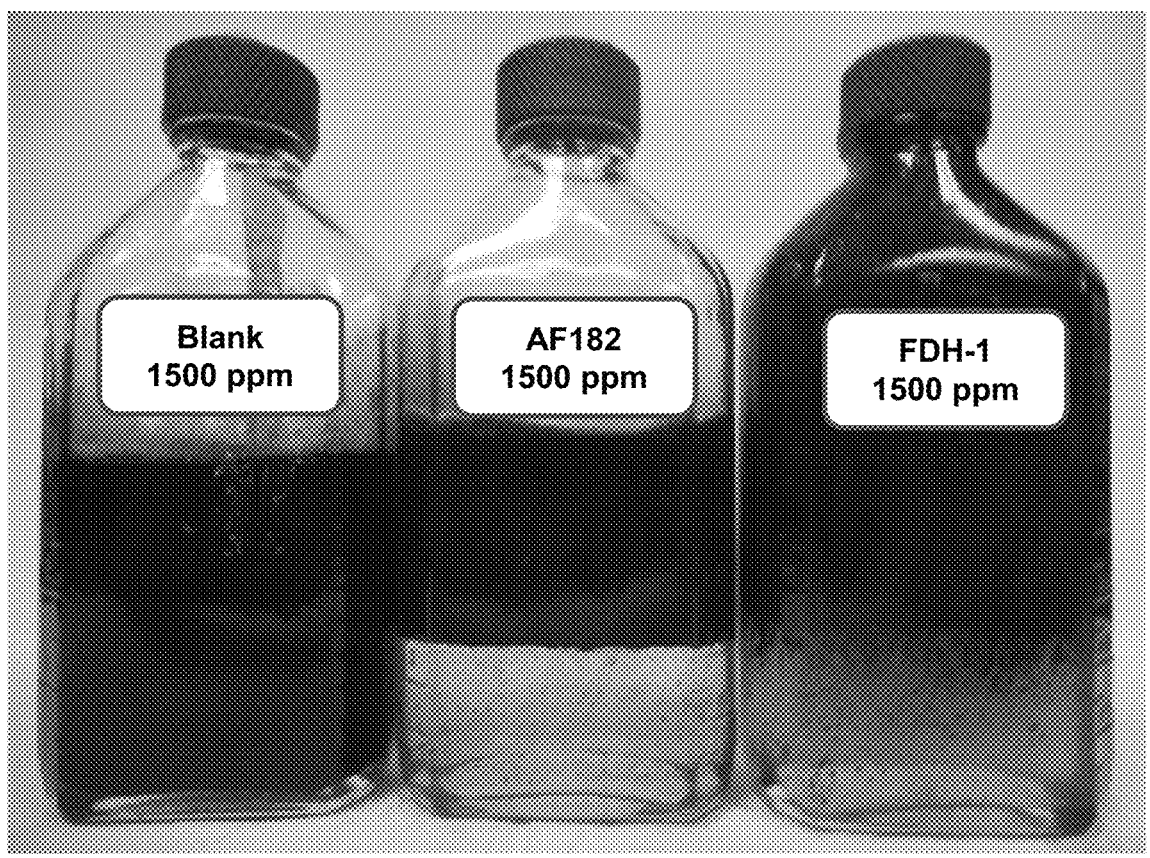
FIG. 6 depicts the images of testing bottles following a dehydrating assessment.

In FIG. 6 is shown the images of the testing bottle once the dehydrating assessment ended: (a) bottle with untreated crude oil; (b) bottle dosed with the AF182 acrylic-carboxyacrylic copolymer, and (c) bottle dosed with the FDH-1 commercial product. All products were dosed at 1500 ppm and evaluated in Ayin-02 crude oil (16.81° API).

Figure 7:
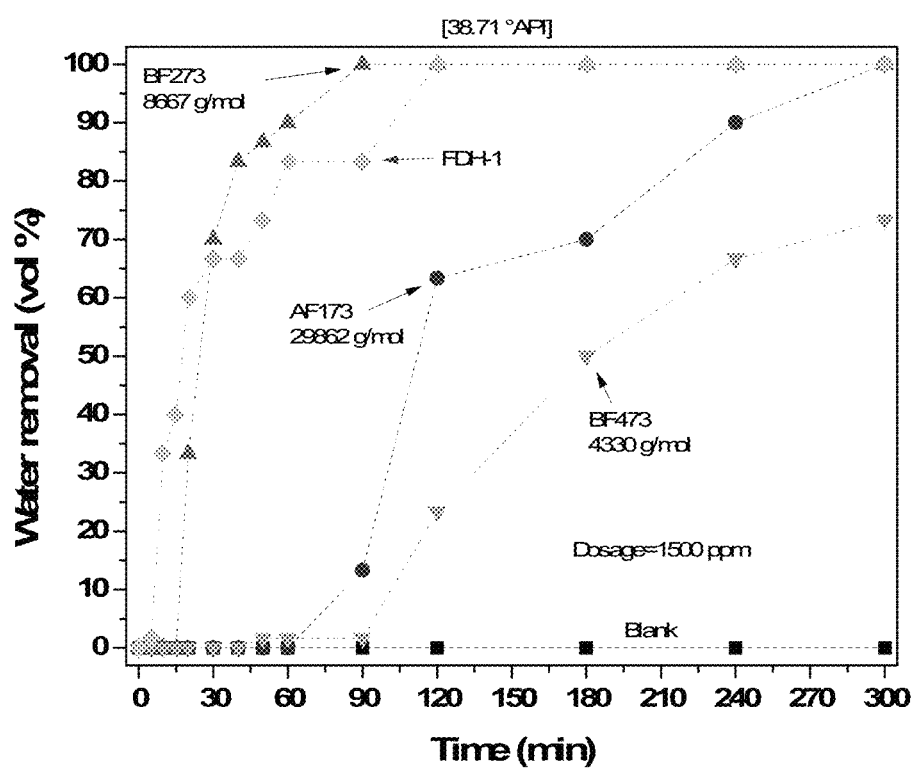
FIG. 7 reports the performance of copolymers based on alkyl acrylate-carboxyalkyl acrylate in light crude oil of 38.71° API (Ayin-01).

FIG. 7 shows the demulsifier activity of three acrylic-carboxyacrylic random copolymers labeled in the present invention as AF173 (with a proportion of A-monomer of 70 wt % and F-monomer of 30 wt %); BFA273 (with a proportion of B-monomer of 70 wt % and F-monomer of 30 wt %) and BF473 (with a proportion of B-monomer of 70 wt % and F-monomer of 30 wt %). Average molecular mass of these copolymers, prepared in a semi-continuous reactor, were adjusted at different values by employing 1, 2 and 4 wt % of chain transfer agent. Dehydrating performance in light crude oil of 38.71° API (Ayin-01) was compared with the FDH-1 commercial formulation; all dosed at 1500 ppm. Similarly, emulsion destabilization was compared with the untreated crude oil (blank).

In the present invention was carried out the synthesis of random copolymers based on alkyl acrylate and carboxyalkyl acrylate (polymers are made up for random sequences of two monomer in polymer chain) and those were evaluated as dehydrating agents in crude oils with densities in the range from 5 to 40° API.

Random copolymers based on alkyl acrylate and carboxyalkyl acrylate as dehydrating agents were prepared according to the following method. This method is illustrative and not imply any limitation:

Random copolymers based on alkyl acrylate and carboxyalkyl acrylate are synthesized by semi-continuous emulsion polymerization as a latex, the synthesis method is described in Mexican application patent MX 338861 B [22]. In this patent, the monomers are fed from an addition tank to the main reactor under starved feed conditions, which guarantees a higher homogeneity in the synthesized copolymers and a random distribution of monomeric units in the chains [23]. Additionally, the semi-continuous process allows controlling the exothermy of the reaction by dosing the pre-emulsion feed to the polymerization reactor. The copolymers are prepared as latex, which is a dispersion of polymeric particles in water, being easy to handle and avoiding the usage of organic solvents. Latex is dewatered by distillation at temperatures from 80 to 120° C. and, at the same time, a suitable organic solvent is added to allow its final application as demulsifying agent in crude oils with densities of 5 to 40° API, employing solvents whose boiling point falls within the range of temperature between 35 to 200° C., such as: dichloromethane, methanol, ethanol, isopropanol, chloroform, benzene and its derivatives, toluene, xylene, jet fuel naphta, individually or mixed. The amount of copolymer in the solution is between 10 to 50 wt %.

In scheme (2) is shown the structure of the different random copolymers based on alkyl acrylate/carboxyalkyl acrylate, comprised in the present invention, preferably alkyl ester of acrylic acid or methacrylic acid:

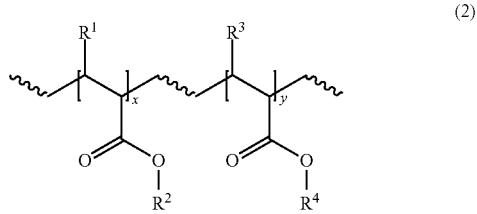

(2)

wherein:

$R^1$, $R^2$, $R^3$ and $R^4$ are independent radicals represented by the groups mentioned bellow:

$R^1$ and $R^3$=H (hydrogen), $CH_3$ (methyl);

$R^2$=(methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl). This aliphatic chain may contain heteroatoms of the ether group, as well as aromatic rings or rings with heteroatoms of the ether type.

$R^4$=$C_3H_5O_2$ (carboxyethyl), $C_4H_7O_2$ (carboxypropyl) y $C_5H_9O_2$ (carboxybutyl).

Wherein, additionally:

x=is a number comprised in the range from 4 to 900.

y=is a number comprised in the range from 4 to 900.

"x" and "y" can be random sequences.

Average number molecular masses are comprised in the ranges from 900 to 472 500 g/mol.

The following describes, by way of example, which does not imply any limitation, the monomers used in the synthesis of the copolymers, object of this invention: methyl acrylate, ethyl acrylate, butyl acrylate, n-amyl acrylate, isobornyl acrylate isobutyl acrylate, tert-butyl acrylate, hexyl acrylate, 2-ethylhexyl acrylate, 3,5,5-trimethylhexyl acrylate, 2-methoxiethyl acrylate, 2-phenoxiethyl acrylate, 4-tert-butylcyclohexyl acrylate, octyl acrylate, isodecyl acrylate, decyl acrylate, lauryl acrylate, tridecyl acrylate, octadecyl acrylate or behenyl acrylateOn the other hand, the carboxyalkyl acrylates used in this invention, it does not imply any limitation: 2-carboxyethyl acrylate, 3-carboxypropyl acrylate, 4-carboxybutyl acrylate, 2-carboxyethyl methacrylate, 3-carboxypropyl methacrylate and 4-carboxybutyl methacrylate.

The method consists in adding an effective amount of random copolymer, based on alkyl acrylate and carboxyalkyl acrylate, to crude oils with densities from 5 to 40° API, at concentrations between 10 and 2000 ppm, in order to induce the demulsification of aforementioned crude oils.

The present invention will be described drawing upon a specific number of examples, which are considered illustrative but do not imply any limitation. Once obtained, copolymers, based on alkyl acrylate and carboxyalkyl acrylate were characterized using the following instrumental methods:

1.—Size exclusion chromatography (SEC), in a size exclusion chromatograph Agilent® model 1100, with PLgel column and using tetrahydrofuran (THF) as eluent, to calculate the copolymer molecular mass distribution and polydispersity index (I).

2.—Fourier Transform Infrared spectroscopy (FTIR), in a FTIR spectrometer model Thermo Nicolet® AVATAR, 330 using the method of film technique with OMNIC® software, version 7.0.

The average molecular masses and polydispersity index of the copolymers based on alkyl acrylate and carboxyalkyl acrylate are shown in Tables No. 1 and 2; the spectroscopic characteristics of some synthesized random copolymers based on alkyl acrylate and carboxyalkyl acrylate, which does not imply any limitation, are also given:

The results of the synthesis of different alkyl-carboxyalkyl copolymers, ($R^1$=hydrogen, $R^2$=n-butyl, $R^3$=hydrogen, $R^4$=2-carboxyethyl), which does not imply any limitation, are reported in Table No. 1:

TABLE NO. 1

Weight composition (wt %), synthesis method, average number molecular mass (Mn, measured by SEC) and polydispersity index (I) of a series of acrylic-carboxyacrylic copolymers synthesized as examples..

| Copolymer | Weight ratio (wt %) | Synthesis method | Mn (g/mol) | I |
|---|---|---|---|---|
| AF164 | 60/40 | Semi-continuous | 14098 | 2.3 |
| AF173 | 70/30 | Semi-continuous | 29862 | 2.3 |
| AF182 | 80/20 | Semi-continuous | 28869 | 2.4 |

The results of the synthesis of different alkyl/carboxyalkyl copolymers, ($R^1$=hydrogen, $R^2$=n-hexyl, $R^3$=methyl, $R^4$=2-carboxyethyl), which does not imply any limitation, are reported in Table No. 2:

TABLE NO. 2

Weight composition (wt %), synthesis method, average number molecular mass (Mn, measured by SEC) and polydispersity index (I) of a series of acrylic-carboxyacrylic copolymers synthesized as examples.

| Copolymer | Weight ratio (wt %) | Synthesis method | Copolymer | I |
|---|---|---|---|---|
| BF264 | 60/40 | Semi-continuous | 10621 | 2.1 |
| BF273 | 70/30 | Semi-continuous | 8667 | 2.3 |
| BF282 | 80/20 | Semi-continuous | 10461 | 2.5 |
| BF473 | 70/30 | Semi-continuous | 4330 | 1.9 |
| BF482 | 80/20 | Semi-continuous | 5450 | 1.8 |

EXAMPLES

The following examples are presented to illustrate the spectroscopic characteristics of the copolymers based on alkyl acrylate and carboxyalkyl acrylate, employed as dehydrating agents of crude oils with API densities between 5 to 40° API. These examples should not be regarded as limiting of what is claimed here.

AF Series

Random copolymer based on alkyl acrylate-carboxyalkyl acrylate, I.R. $v$ $cm^{-1}$: 3206, 2959, 2934, 2874, 1737, 1455, 1395, 1250, 1160, 1117, 1067, 1022, 944, 840.

BF Series

Random copolymer based on alkyl acrylate-carboxyalkyl acrylate, I.R. $v$ $cm^{-1}$: 3203, 2959, 2934, 2874, 1736, 1454, 1396, 1255, 1166, 1117, 1067, 1022, 943, 840.

Evaluation of Random Copolymers Based on Alkyl Acrylate and Carboxyalkyl Acrylate as Dehydrating Agents of Crude Oils with Densities Between 5 to 40° API.

Different concentrated solutions of each one of the synthesized copolymers were prepared, since 5 to 40 wt %, employing solvents with boiling point falling within the range of temperature from 35 to 200° C., as dichloromethane, methanol, ethanol, isopropanol, chloroform, benzene and its derivatives, toluene, xylene, jet fuel, naphtha, individually or mixed. A small volume of the solvent was added to the solution hindering that any solvent effect on the water removal from crude oil. Copolymers based on alkyl acrylate and carboxyalkyl acrylate were evaluated at a concentration in the range from 10 to 2000 ppm. Polymers were simultaneously evaluated and were compared to a commercial dehydrating formulation (FDH-1), widely used in the oil industry.

The polymers composing the FDH-1 formulation are described in Table 3. It should be noted that this chemical product is a formulation of several block copolymers based on polyethers, each one with a function as emulsion breaker, coalescer of water droplets in crude oil or clarifier of the aqueous phase. The fact that the dehydrating FDH-1 formulation consists of several polyethers (dehydrating basics), makes it more expensive. In contrast, alkyl acrylate-craboxyalkyl acrylate copolymers were not formulated, because a single molecule has the three demulsifying functions (breaker, coalesce and clarifier). The integration of the three properties into a single molecule represents an advantage over the commercial formulation, since the demulsifying product is prepared in one-step reaction and a further mixing step is not required.

TABLE NO. 3

Commercial formulation FDH-1 composition, including average molecular mass Mn and composition of POP/POE (wt %).

| | FDH-1 Formulation | |
|---|---|---|
| Label | Mn (g/mol) | Composition (wt %) |
| TP 89 | 7750 | 90/10 |
| TP 03 | 5330 | 70/30 |
| TP 14 | 3050 | 60/40 |
| TP 71 | 1400 | 90/10 |

The assessment procedure is described below: the number of graduated bottles, provided with inserts and covers, is indicated by the number of compounds to evaluate, and one more, corresponding to additive-free crude oil (blank) was included; crude oil was added until the mark of 100 mL. All testing bottles were placed in a water bath with controlled temperature at 80° C. by 20 minutes. At the end of this time, one aliquot of the solution of every synthesized random copolymer and the commercial product (FDH-1) was added. All bottles were shaken during 2 minutes, at a speed of 2 blows per second. After being purged, these bottles were placed again in the thermalized bath and the breakdown of water in oil emulsion was read every 5 minutes during the first hour and, subsequently, every hour, along the the evaluation time (5 h). All the copolymers of this invention and the commercial formulation were evaluated at different concentrations, in the range between 100 and 2000 ppm.

The crude oils employed to evaluate as dehydrating agents the random copolymers, based on alkyl acrylate/carboxyalkyl acrylate, were characterized as follows:

By way of demonstration, which does not imply any limitation, the results of the evaluation described above are reported in FIGS. 1, 3, 5, and 7, whereas images of bottles after the evaluation are shown in FIGS. 2, 4, and 6.

In FIG. 1 is observed the difference on dosage of the AF182 acrylic-carboxyacrylic random copolymer in comparison with the FDH-1 commercial formulation in crude oil with a density of 6.11° API (Ayin-04). AF182 copolymer at 1500 ppm started breaking down the emulsion at 5 min of assessment, reaching to remove 100 vol % of emulsified water of crude oil at 120 min. By reducing the dosage of copolymers to 1000 and 500 ppm, the copolymer removed 80 and 67 vol % of emulsified water, respectively. Respecting the FDH-1 commercial formulation at dosage of 1500 ppm, this was able to break down water/crude oil emulsion until 30 min; however, after 180 min of assessment, it showed a behavior very similar at dosages of 1500 and 1000 ppm, reaching to eliminate 49 vol % of emulsified water in both cases. When the dosage was decreased to 500 ppm, the water removal efficiency dropped away until 38 vol %. Therefore, AF acrylic copolymers synthesized by emulsion polymerization showed a better performance as demulsifier agent than the commercial formulation. Finally, it was also observed that blank sample (untreated crude oil) was not able to remove emulsified water, which shows the stability of water/crude oil emulsion.

TABLE NO. 4

Physicochemical characterization of crude oils

| Propiedad | Ayin-01 | Ayin-02 | Ayin-03 | Ayin-04 |
|---|---|---|---|---|
| ° API | 38.71 | 16.81 | 7.55[a] | 6.11[b] |
| Sal content (lb/Mbbl) | 14.13 | 4275.00 | 2732.00 | 37.00 |
| Wax (wt %) | 1.35 | 3.11 | 3.90 | 0.73 |
| Pour point (° C.) | −27.00 | −24.00 | −15.00 | +6 |
| Distilled water (vol %) | 0.10 | 18.00 | 25.00 | 66.4 |
| Water and sediments (vol %) | 0.90 | 21.00 | 27.00 | 68.0 |
| Kinematic viscosity (mm$^2$/s) @ 25° C. | 4.87 | 993.97 | 2945.15 | 111063 |
| Cryoscopy MW (g/mol) | 242.50 | 320.01 | 415.18 | 1140 |
| Osmometry MW (g/mol) | 466.20 | 891.14 | 2132.11 | 1205 |
| n-heptane insolubles (wt %) | 0.30 | 12.14 | 14.78 | 9.99 |
| SARA Analysis | | | | |
| Saturates (wt %) | 52.71 | 20.38 | 20.35 | 12.02 |
| Aromatics (wt %) | 36.72 | 39.32 | 36.17 | 51.10 |
| Resins (wt %) | 9.85 | 26.71 | 26.43 | 20.37 |
| Asphaltenes (wt %) | 0.69 | 13.52 | 16.95 | 16.45 |

[a]Gravity of 11.15° API after dehydrating.
[b]Gravity of 12.89° API after dehydrating.

In FIG. 2 is compared the emulsified water removal efficiency of the AF182 acrylic copolymer regarding the FDH-1 commercial formulation. Firstly, the AF182 copolymer leaded to a homogenous breakdown of phase, whereas the FDH-1 formulation provoked a no-homogeneous breakdown. The clarification of both compounds is good; therefore, alkyl carylate-carboxyalkyl acrylate copolymer has clear advantages as demulsifier agent in comparison with the FDH-1 formulation.

In FIG. 3 is observed the composition effect of acrylic-carboxyacrylic random copolymer of AF series, dosed at 250 ppm in crude oil with density of 7.55° API (Ayin-03). It is observed that the AF182 copolymer (28869 g/mol), containing 80 wt % of alkylacrylic monomer, is capable to take out 100 vol % of emulsified water at the end of assessment. Decreasing the amount of alkylacrylic monomer as in AF173 and AF164 copolymers, water removal efficiency drops away, yielding 90 and 51 vol %, respectively. The FDH-1 commercial formulation showed a lower demulsifying efficiency than AF182 and AF173 copolymers, reaching to only remove 85 vol % of emulsified water.

In FIG. 4 is viewed the excellent clarification prompted by the AF182 acrylic-carboxyacrilic copolymer dosed at 250 ppm. In the case of the FDH-1 commercial formulation was observed a lower clarification than the AF182 copolymer. In this way, it is evidenced the best performance as clarifiers of acrylic-caboxyacrylic copolymers of controlled molecular mass, protected by this patent application. Clarification of aqueous phase achieved with the addition of acrylic-caboxyacrylic copolymers is even superior to acrylic products reported by Hernandez et al. [19].

In FIG. 5 is shown the effect of molecular mass of acrylic-caboxyacrylic copolymers on removal of emulsified water in crude oil of 16.81° API, dosed at 1500 ppm. In this case, the AF182 copolymer, (28869 g/mol), displayed the best performance as dehydrating agent, being the first one to break down the water/crude oil emulsion at 15 min and withdrawing 100 vol % of emulsified water from crude oil at 240 min. When molecular mass is reduced like the BF282 copolymer (10461 g/mol), the performance as demulsifier agent decreased in this crude oil, breaking down the emulsion after 120 min and reaching a maximal water removal efficiency of 67 vol %. The FDH-1 commercial product reached to remove 100 vol % of emulsified water until 300 min; furthermore, it presented a lower capacity of breakdown of emulsion than the AF182 copolymer, destabilizing the emulsion after 60 min.

In FIG. 6 is evinced the best performance of the AF182 acrylic-caboxyacrylic copolymer dosed at 1500 ppm as clarifier of removed water, in comparison with the FDH-1 commercial formulation.

In FIG. 7 is observed the effect of molecular mass of acrylic-caboxyacrylic random copolymers, with a proportion of 70 wt % of alkyl acrylate monomer and 30 wt % of carboxyalkyl acrylate monomer, on its performance as dehydrating agent dosed at 1500 ppm in crude oil of 38.71° API (Ayin-04). At this dosage, the BF273 acylic-carboxyacrylic copolymer, (8667 g/mol), broke down water/crude oil emulsion at 15 min, and eliminated 100 vol % of emulsified water at 90 min. The AF173 copolymer, (29862 g/mol), could break down emulsion after 50 min, reaching 100 vol % until 300 min. Regarding the BF473 copolymer (5450 g/mol), the water removal efficiency drops away until 73 vol %. Therefore, molecular mass of acylic-carboxyacrylic copolymers has an important effect on water removal efficiency in crude oils. Although, the FDH-1 commercial product was the first one to break down the emulsion at 5 min, took 30 min more than the BF273 copolymer to take out 100 vol % of emulsified water (120 min), thus its performance as coalesce at this dosage is lower than acylic-carboxyacrylic copolymer.

The invention claimed is:

1. Random copolymers based on alkyl acrylate and carboxyalkyl acrylate as dehydrating agents, comprising:
copolymers having the structural formula (2) with number average molecular weights between 900 and 472 500 g/mol:

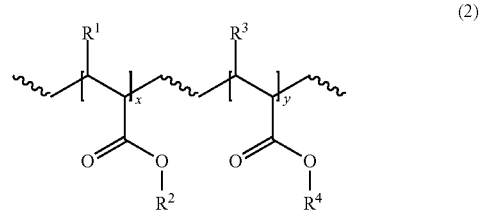

(2)

wherein:
$R^1$, $R^2$, $R^3$ and $R^4$ are independent radicals represented by the groups mentioned below:
$R^1$ and $R^3$=H (hydrogen), $CH_3$ (methyl);
$R^2$=(methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl), wherein the aliphatic chain may contain heteroatoms of the ether group, as well as aromatic rings or rings with heteroatoms of the ether group; and
$R^4$=$C_3H_5O_2$ (carboxyethyl), $C_4H_7O_2$ (carboxypropyl) and $C_5H_9O_2$ (carboxybutyl);
wherein, "x" is a number comprised in the range from 4 to 900 and "y" is a number comprised in the range from 4 to 900;
wherein "x" and "y" can be random sequences; and
wherein the copolymers are configured to remove emulsified water in crude oil with densities from 5 to 40° API.

2. A synthesis of random copolymers based on alkyl acrylates and carboxyalkyl acrylates as dehydrating agents of crude oils, wherein the random copolymers have a structural formula (2) with number average molecular weights between 900 and 472 500 g/mol:

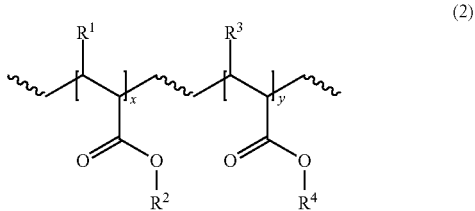

(2)

wherein:

$R^1$, $R^2$, $R^3$ and $R^4$ are independent radicals represented by the groups mentioned below:

$R^1$ and $R^3$=H (hydrogen), $CH_3$ (methyl);

$R^2$=(methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl), wherein the aliphatic chain may contain heteroatoms of the ether group, as well as aromatic rings or rings with heteroatoms of the ether group; and $R^4$=$C_3H_5O_2$ (carboxyethyl), $C_4H_7O_2$ (carboxypropyl) and $C_5H_9O_2$ (carboxybutyl);

wherein, "x" is a number comprised in the range from 4 to 900 and "y" is a number comprised in the range from 4 to 900;

wherein "x" and "y" can be random sequences; and wherein the copolymers are configured to remove emulsified water in crude oil with densities from 5 to 40° API; and wherein the synthesis is carried out by semi-continuous emulsion polymerization.

3. The synthesis of random copolymers based on alkyl acrylates and carboxyalkyl acrylates, as dehydrating agents of crude oils, according to claim 2, wherein selected acrylic monomers are selected from the group consisting of: methyl acrylate, ethyl acrylate, butyl acrylate, n-amyl acrylate, isobornyl acrylate, isobutyl acrylate, tert-butyl acrylate, hexyl acrylate, 2-ethylhexyl acrylate, 3,5,5-trimethylhexyl acrylate, 2-methoxyethyl acrylate, 2-phenoxyethyl acrylate, 4-tert-butylcyclohexyl acrylate, octyl acrylate, isodecyl acrylate, decyl acrylate, lauryl acrylate, tridecyl acrylate, octadecyl acrylate or behenyl acrylate.

4. The synthesis of random copolymers based on alkyl acrylates and carboxyalkyl acrylates, as dehydrating agents of crude oils, according to claim 2, wherein selected carboxyacrylic monomers are selected from the group consisting of: 2-carboxyethyl acrylate, 3-carboxypropyl acrylate, 4-carboxybutyl acrylate, 2-carboxyethyl methacrylate, 3-carboxypropyl methacrylate and 4-carboxybutyl methacrylate.

5. The random copolymers based on alkyl acrylate and carboxyalkyl acrylate as dehydrating agents of crude oils, according to claim 1, wherein the copolymers are formulated as solution employing organic solvents.

6. The random copolymers based on alkyl acrylate and carboxyalkyl acrylate as dehydrating agents of crude oils, according to claim 5, wherein the organic solvents employed for formulation present boiling points between 35 and 200° C.

7. The random copolymers based on alkyl acrylate and carboxyalkyl acrylate as dehydrating agents of crude oils, according to claim 5, wherein the organic solvents for formulation are chosen from a group consisting of: dichloromethane, methanol, ethanol, isopropanol, chloroform, benzene and its derivatives, toluene, xylene, turbosine and naphtha, individually or mixed.

8. The random copolymers based on alkyl acrylate and carboxyalkyl acrylate and dehydrating agents of crude oils, according to claim 5, wherein the concentration in the formulation of dried random copolymers, based on alkyl acrylates and carboxyalkyl acrylates, is between 10 and 50 wt %.

9. The random copolymer based on alkyl acrylate and carboxyalkyl acrylate as dehydrating agents of crude oils, according to claim 5, wherein the formulations are dosed in the range of concentration between 10 and 2000 ppm.

* * * * *